United States Patent [19]

Coleman et al.

[11] Patent Number: 4,868,658

[45] Date of Patent: Sep. 19, 1989

[54] METHOD AND APPARATUS FOR MULTIPLEXING TELEVISION SIGNALS

[75] Inventors: Guy B. Coleman, Northridge; James W. Henderson, Woodland Hills; Jack Sacks, Thousand Oaks, all of Calif.

[73] Assignee: Multilink Group, Calabasas, Calif.

[21] Appl. No.: 808,908

[22] Filed: Dec. 13, 1985

[51] Int. Cl.$^4$ .............................................. H04N 7/04
[52] U.S. Cl. ..................................... 358/141; 358/133
[58] Field of Search ............... 358/142, 141, 146, 136, 358/135, 133, 12

[56] References Cited

U.S. PATENT DOCUMENTS

| | | | |
|---|---|---|---|
| 4,027,333 | 5/1977 | Kaiser et al. | 358/146 |
| 4,215,370 | 7/1980 | Kirk, Jr. | 358/146 |
| 4,467,356 | 8/1984 | McCoy | 358/146 |
| 4,533,936 | 8/1985 | Tiemann et al. | 358/12 |
| 4,533,960 | 8/1985 | Tiemann et al. | 358/12 |
| 4,613,903 | 9/1986 | Nadan | 358/142 |
| 4,633,311 | 12/1986 | Gordon | 358/141 |
| 4,691,245 | 9/1987 | Hickok | 358/142 |

FOREIGN PATENT DOCUMENTS 0157394  8/1985  Japan ...................... 358/14

OTHER PUBLICATIONS

"Processor Offers Security, Doubles TV Channel Capacity", Williard, et al; *Private Cable,* Oct. 1983, pp. 16–21.
"Comband—GE's New Bandwidth Compression System"; GE Brochure.
"Time–Frequency Multiplexing (TFM) of Two NTFC Color TV Signals–Simulation Results"; B. G. Haskell; *Bell System Technical Journal,* vol. 60, No. 5, May–Jun., 1981.
"Transmission of Two NTSC Color Television Signals Over a Single Satellite Transponder Via Time-Frequency Multiplexing"; R. L. Schmidt; Copyright 1982 IEEE.

*Primary Examiner*—James J. Groody
*Assistant Examiner*—David E. Harvey
*Attorney, Agent, or Firm*—Ashen, Golant, Martin & Seldon

[57] ABSTRACT

A multiplexer for compressing two television programs into the bandwidth normally required for a single television signal is disclosed wherein vertically adjacent lines in the odd and even field of each frame are summed and differenced in pairs having the same color subcarrier phase. "Line pair signals" respectively comprising the sum and difference of each line pair are then formed after the difference signal is time compressed without an overall increase in bandwdth. The line pair signals for each frame of one program are alternately transmitted with the line pair signals of a frame from the second program. The line pair signals of a video frame are fewer in number and longer in duration than NTSC field lines. Timing is such that one frame of both programs is transmitted during the time allotted to the transmission of one frame under the NTSC standard. The lines from odd fields of each program are reconstructed after transmission by adding the appropriate difference signals and sum signals. The lines from even fields are reconstructed by differencing the sum signals and the difference signals.

23 Claims, 8 Drawing Sheets

FIG. 3
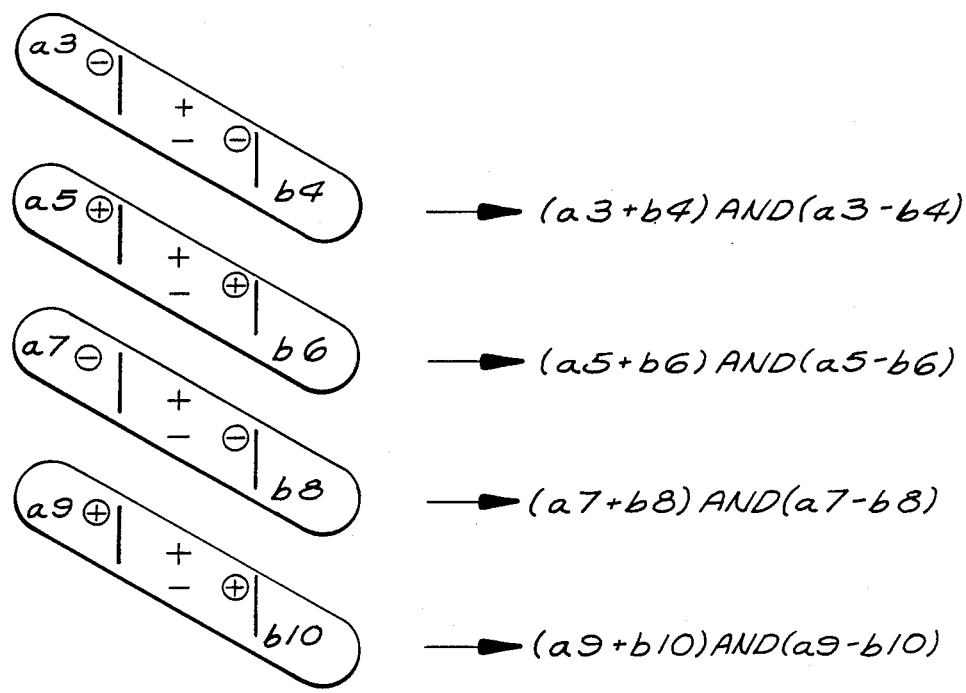
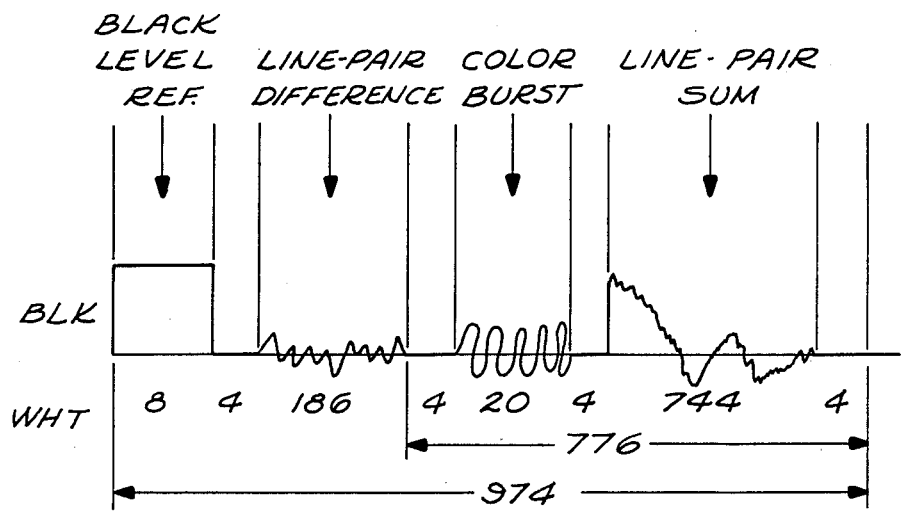
FIG. 5

METHOD AND APPARATUS FOR MULTIPLEXING TELEVISION SIGNALS

BACKGROUND OF THE INVENTION

This invention relates to the transmission and reception of television programs and more particularly to the multiplexed transmission of two television programs via the same communication link.

The multiplexing of television pictures has been a subject of intensive research in recent years for a number of reasons. First, there are a limited number of communication channels available. Secondly, even when available, a channel may be available for only a limited period of time. Additionally, the individual transponders of typical communications satellites are bandwidth limited to one television broadcast at a time if the full signal-to-noise ratio is to be preserved.

Although multiplexing would be highly desirable economically, there have been a host of technical problems which have prevented the commercialization of a practical multiplexing system. The desirability of a multiplexing system, together with the technical shortcomings of prior art multiplexers, are described in U.S. Pat. Nos. 4,027,333 and 4,215,370, the contents of both being hereby incorporated by reference.

U.S Pat. No. 4,215,370 discloses a multiplexer wherein the transmitted wave comprises a series of standard interval (1/15.734 kHz) line signals, each of which includes a time-compressed line of video intelligence of the first program, a small part of the video intelligence at the beginning of the next line of the second program, and the full next line of video intelligence of the second program repeated from its beginning. The disclosed system, however, significantly increases the bandwidth of the transmitted signal beyond that of either of the original video signals.

U.S. Pat. No. 4,027,333 discloses a system wherein the odd numbered fields of one picture are transmitted in alternation with the even numbered fields of the other picture. The received field is delayed and recombined with their respective undelayed fields to recreate the two separate pictures.

U.S. Pat. No. 4,467,356 discloses a multiplexer wherein two input pictures are compressed horizontally, one to ¾ width and the other to ¼ width, and combined side by side to form a single picture suitable for transmission over a standard link. The two signals are interchanged on alternate fields.

SUMMARY OF THE INVENTION

The multiplexing system herein includes novel means for encoding television programs to be transmitted and novel means for decoding the transmitted signal.

The programs are encoded by designating a plurality of line pairs from the television lines of the odd and even fields of the program frame to be transmitted, producing line-pair sum signals proportional to the sum of the video line signals for respective line pairs, producing bandlimited, time-compressed, line-pair difference signals proportional to the difference of the line signals for respective line pairs and having substantially less bandwidth than that of two baseband signals, and forming line-pair line signals from the sum and difference signals.

Preferably, each line-pair line signal is formed from the sum and difference signal of the same line pair; however, those skilled in the art will recognize that, with appropriate modifications to the encoding and decoding processes, sum and difference signals from different line pairs can be joined to form line-pair line signals in accordance with the invention.

The line-pair line signals of a frame of a program are outputted during one or more time intervals whose total is substantially equal to the time allotted by the transmission system for transmission of a program field. Preferably, the entire frame of the first program is followed by the entire frame of the second program, although those skilled in the art will recognize that the line-pair line signals from both programs can also be interlaced, with appropriate changes to the encoding and decoding systems, without departing from the spirit of the invention.

The transmitted signal is decoded at the receiving end to recover the odd and even field information of both programs. In essence, the information for each line of a pair is substantially recovered by respectively adding and subtracting the sum and difference signals which were formed from the line pair.

The encoding means includes a sum signal producing means for producing sum signals proportional to the sums of the line signals of respective lines in the odd field of a video frame and associated line signals in the even field; differential signal producing means for producing difference signals proportional to the differences between the associated line signals; compression means for time-compressing the difference signals without essentially increasing their bandwidth beyond the bandwidth of the sum signals; and means for sequentially producing the sum and compressed differential signals for the odd and even fields of a video frame during no more than approximately one-half the frame time allotted by the transmission system.

Additionally, means are provided for sequentially outputting the sum and compressed differential signals of both programs so that information pertaining to a frame of both television signals occupies approximately the frame time allotted by the transmission system for a single television signal.

Decoding means in accordance with the invention comprises means for summing the sum and differential signals of a line pair to substantially recover one of the two video frame lines; and means for differencing the sum and differential signals of the line pair to substantially recover the other of the two video frame lines.

Those skilled in the art will recognize that the line-pair signals need not be a sum and difference signal. In the broadest sense, one may use any pair of mathematically linearly independent linear combinations, one of which is time-compressed without increasing its bandwidth substantially beyond that of the other.

The invention, both as to its apparatus and method of operation, together with additional details and advantages will best be understood with the aid of the following Description of the Preferred Embodiment, of which the following drawing is a part.

DESCRIPTION OF THE DRAWING

FIG. 3 is a pictoral representation of the defining of paired lines and the line-pair sum and difference signals in accordance with the invention;

FIG. 5 is a schematic illustration of a reformatted line waveform produced in accordance with the invention;

DESCRIPTION OF THE PREFERRED EMBODIMENT

Figure 1:
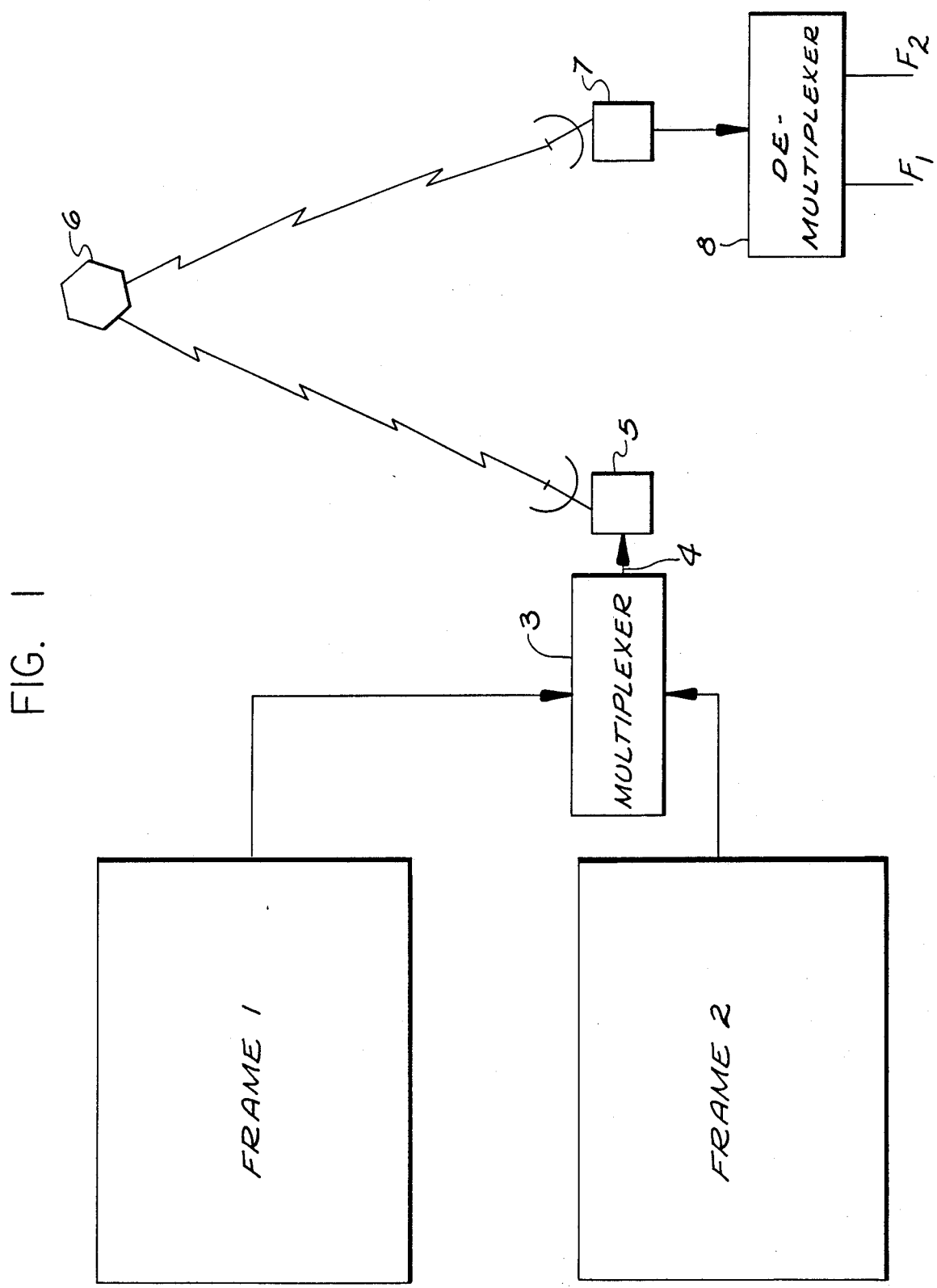
FIG. 1 is an illustration of the fundamental operation of a multiplexing system constructed in accordance with the invention.

The invention herein comprises both an apparatus and method for packing two television signals into the bandwidth normally required by one such signal. The method and system described herein is particularly suitable for NTSC broadcast systems used in the United States, Japan and other parts of the world, although those skilled in the art will recognize its pertinence to other systems used elsewhere in the world. For convenience, the description of the multiplexer will accordingly be described in terms of the NTSC system, with the understanding that, with modifications, its use is not so limited.

It will also be understood that the multiplexer herein need not pack two television signals into the bandwidth normally required by one of the signals, but may simply utilize less bandwidth than twice that required by a single television signal if the transmission system can accommodate the greater bandwidth.

Broadly, the method herein comprises novel encoding of both television programs to be multiplexed, the transmission of the multiplexed signal, and novel decoding of the received signal.

The encoding of each NTSC television program can be best explained by reference to a single frame of one program. That frame is composed of interlaced odd and even fields. Accordingly, a line in one field is spatially between a pair of lines in the alternate field; however in the time domain, all the lines of one field are produced before the lines of the second field.

In accordance with the invention, a frame of a program is encoded by pairing the lines of the odd and even fields to form a plurality of line pairs. Preferably each line pair is formed from a line in the odd field together with the vertically adjacent line in the even field which has the same color subcarrier phase.

A "line-pair sum" signal is produced which is proportional to the sum of the video line signals for the respective line pair. Because the line signal of an odd field line is added to the line signal of the vertically adjacent even field line having the same color subcarrier phase, the color information is substantially retained.

Similarly, a line-pair difference signal from each line pair is produced. The line-pair difference signal is proportional to the difference of the line signals associated with the paired field lines. The line-pair difference signal of each line pair is first low pass filtered, thereby decreasing its bandwidth, and then time-compressed. The bandwidth increase due to time-compression is compensated for by the bandwidth reduction resulting from the previous low-pass filtering. Accordingly, the bandwidth of the compressed signal does not exceed the bandwidth of the unfiltered and uncompressed signal.

Preferably, the cutoff frequency of the low pass filter is about 1 MHz, permitting a compression ratio of 4:1.

Reformatted line signals are formed for transmission. The term "reformatted" is used to distinguish the line signals formed in accordance with the invention, from conventional television line signals. As will become apparent, the reformatted line signals are fewer in number, longer in duration, and different in content from conventional line signals.

The reformatted line signals are produced from the line-pair sum and compressed line-pair difference signals. Preferably, the line-pair sum signal of a given line pair is joined sequentially with the line-pair difference signal of the same line pair. The reader will appreciate that the information for substantially an entire frame is represented by a plurality of the aforementioned reformatted line signals, and that there are approximately half as many reformatted line signals as frame lines. Stated another way, there are approximately the same number of active reformatted line signals as there are active field lines. Accordingly, a frame of video information of one program may be transmitted alternately with a frame of video information from a second program, with the total transmission time of both frames.

In accordance with the invention, the length of the reformatted line signals need not be the "standard" length of approximately 63.6 microseconds, but may instead be longer in duration than the NTSC line signals, and fewer in number.

The multiplexed signal, comprising a succession of the reformatted line signals of both programs, is transmitted through standard television channels. The multiplexed signal can be decoded, and the two programs reconstructed, either at the ground station which receives the broadcast or at any other site.

The decoding process can best be explained by reference again to the frame of one of the programs to be reconstructed. The line-pair sum signal of a line pair is added to the line-pair difference signal of the line pair to recover the information for one of the field lines. Thus, $$k((\text{line } 1 + \text{line } 2) + (\text{line } 1 - \text{line } 2)) = \text{line } 1; \quad \text{(Eq. 1)}$$
$$\text{where } k = \text{a scaling factor of } 0.5$$

where k=a scaling factor of 0.5

Similarly, the line-pair sum and line-pair difference signals of the line pair are differenced to obtain the other field line of the frame. Thus, $$k((\text{line } 1 + \text{line } 2) - (\text{line } 1 - \text{line } 2)) = \text{line } 2 \quad \text{(Eq. 2)}$$

Both the addition and differencing decoding processes take place after the difference signal has been time-expanded to its original time interval.

In an NTSC broadcast system, a baseband television signal is allotted a 4.2 MHz bandwidth. The multiplexer system to be described below is adapted to compress sufficient video information from two television signals into a 4.2 MHz bandwidth multiplexed signal to enable one or both television programs to be substantially reconstructed at the receiving end. In addition to having substantially the same 4.2 MHz bandwidth as a single standard video signal, the transmitted signal has a similar spectral distribution, thereby preserving the signal-to-noise ratio through satellite and other transmission links.

FIG. 1 is an illustration of the fundamental operation of a multiplexing system constructed in accordance with the invention. The video frames 1, 2 of a pair of television signals, are coupled into a multiplexer 3 constructed in accordance with the invention. Each of the signals is a standard NTSC signal of the type used for color transmission in the United States, Japan, and a number of other countries. Accordingly, each signal has a standard 4.2 MHz bandwidth.

The multiplexer 3 combines the information in both frames to produce a single multiplexed output signal 4 having the same 4.2 MHz bandwidth normally required by either of the input signals. The multiplexed signal is transmitted to a ground station 5 for uplinking to the transponder of a communications satellite 6. The satellite 6 retransmits the multiplexed signal to a second ground station 7, and the multiplexed signal is decoded by a decoder 8 to reconstruct the two frames of each program. The decoder 8 may be located at the ground station, at the location where at least one of the multiplexed programs is to be viewed, or anywhere in between.

Figure 2A:
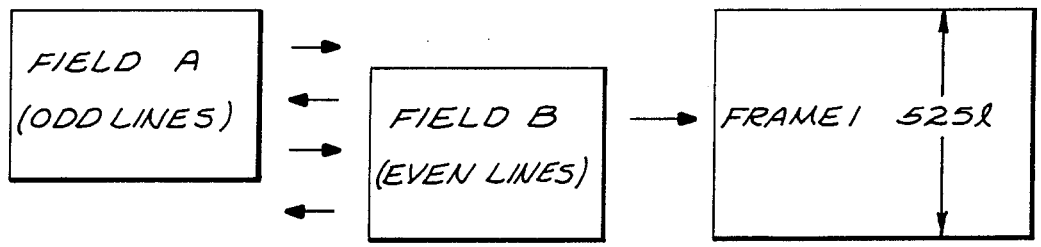
FIGS. 2A and 2B are respectively front elevation and side elevation views in schematic of the pictoral components of frame 1 in FIG. 1.
Figure 2B:
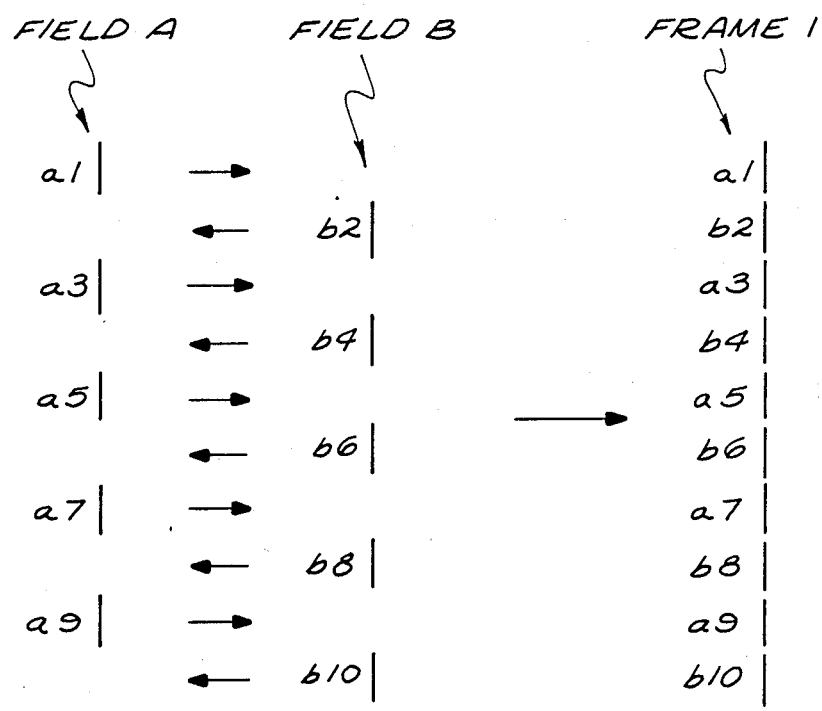

Attention is initially directed to frame 1 and to its pictoral components, so that the operation of the multiplexer can be explained. FIGS. 2A and 2B respectively provide front elevation and side elevation views, in schematic, of the pictoral components of frame 1. An NTSC television picture, or frame 1 is shown to comprise 525 lines, each line, in turn, comprising 910 samples when sampled at exactly four times the color subcarrier frequency.

The frame 1 is formed by two alternatively displayed fields A, B. Field A includes all of the odd lines in the frame, while field B includes all the even lines in the frame. Accordingly, field A is illustrated as comprising lines a1, a3, a5, a7, a9 . . . , while field B comprises lines b2, b4, b6, b8, b10 . . . Those skilled in the art recognize an NTSC frame has 525 lines, with lines a263 and b2 being ½ line in length.

Although the color subcarrier phase of adjacent lines of a field are of opposite phase, the frame can be subdivided into pairs of adjacent lines having the same color subcarrier phase. Accordingly, each video line in FIG. 2B is identified by a circled algebraic sign indicative of the relative color subcarrier phase of that line, to show adjacent line pairs a3b4, a5b6, etc., having the same color subcarrier phase.

Turning to FIG. 3, a schematic representation similar to FIG. 2B of an end view of an NTSC video display are pictorally illustrated so that multiplexer's signal processing of program 1 can be explained. In the first multiplexing step, the vertically adjacent lines in the odd and even fields of each frame are summed and differenced in pairs having the same color subcarrier phase. Accordingly, line a3 is summed and differenced with line b4 to form line-pair sum signals (a3+b4) and line-pair difference signal (a3−b4). Similarly, line a5 is summed and differenced with b6 to obtain line-pair sum and difference signals (a5+b6) and (a5−b6), respectively, for that line pair. The line-pair difference signals are subsequently bandlimited.

It can be incidentally noted at this point that lines a3 and b4, for example, may be substantially reconstructed quite simply by summing and differencing the related line-pair sum signal and line-pair difference signal. Accordingly:

$$(a3 + b4)/2 + (a3 - a4)/2 = a3' \qquad \text{(Eq. 3)}$$
$$(a3 + b4)/2 - (a3 - b4)/2 = b4' \qquad \text{(Eq. 4)}$$

One may observe from Equations 3 and 4 that the adjacent lines of both fields of a video frame can be substantially reconstructed from the line-pair sum and line-pair difference signals. The reconstructed lines a3', b4' are close approximations to the original lines a3, b4. Scene information having horizontal spectral content less than 1 MHz is reconstructed perfectly, both horizontally and vertically. Above 1 MHz, line pairing occurs; it has been found, however, that this is subjectively acceptable. Accordingly, by transmitting only one reformatted line signal, comprising both of the line-pair signals, two field lines can be reconstructed.

In order to multiplex two television programs all the line-pair signals for a frame of program 1 and all the line-pair signals for a frame of program 2 are sent during the time allotted by NTSC standards for a single frame. Accordingly, the multiplexer next arranges the two frames of information into a format which requires only a NTSC frame time to transmit; i.e., almost 1/30 second. The formatting of the multiplex signal for transmission is best explained by reference to FIGS. 4A–4C.

Figure 4A:
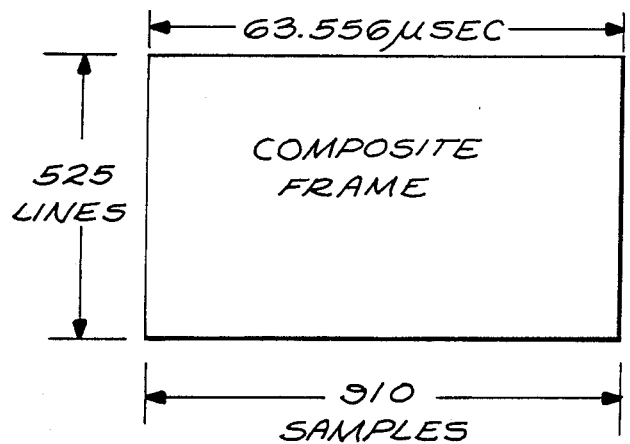
FIG. 4A-4C illustrate the NTSC format compared with the format of a preferred multiplexing system.
Figure 4B:
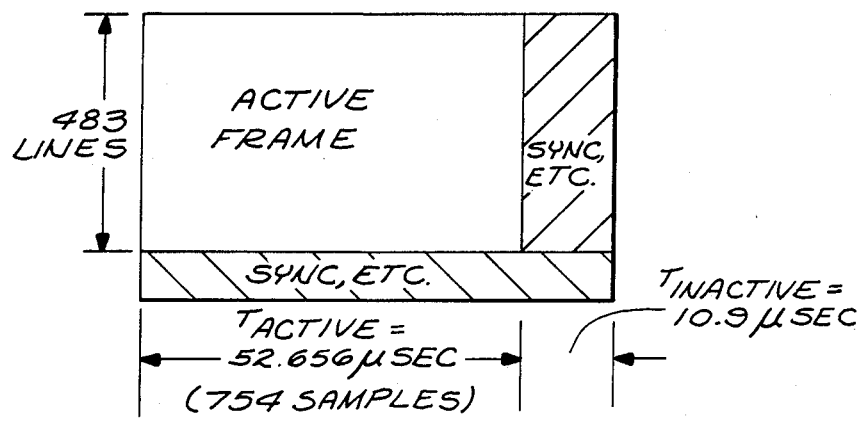
Figure 4C:
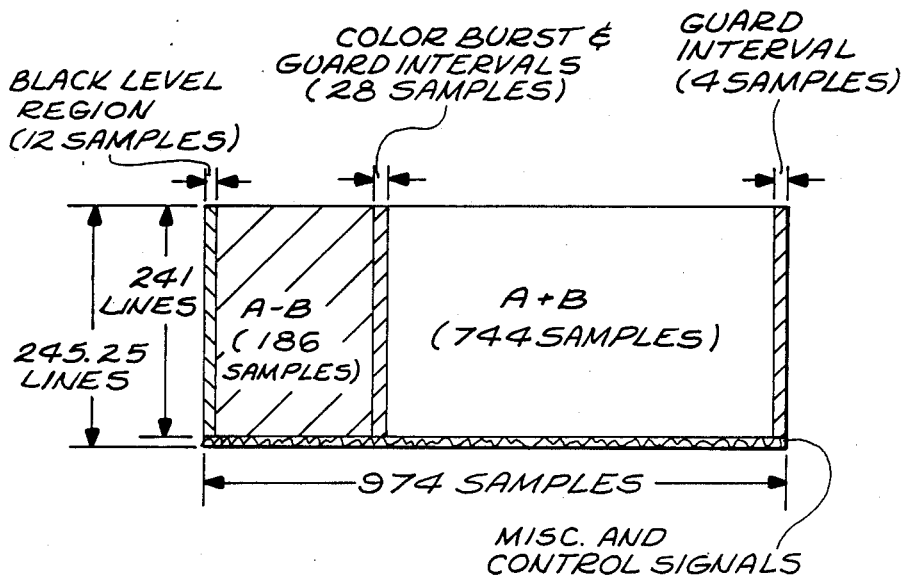

FIGS. 4A and 4B pictorally illustrates the standard NTSC format, while FIG. 4C illustrates the format utilized in accordance with the invention. Turning first to FIG. 4A, an NTSC frame is seen to comprise a matrix of 525 lines by 910 samples, when samples are taken at exactly four times the color subcarrier frequency. Each frame line is scanned in approximately 63.556 microseconds.

As those skilled in the art know, only a portion of the frame represents displayed data. FIG. 4b shows that a video frame comprises an active region comprising 483 lines, each of which is scanned in approximately 52.656 microseconds. During the active portion of the frame, the video signal contains picture information.

The remaining 10.9 microseconds comprises a blanking interval. During the inactive portion, or "blanking interval" of the frame, the video scanning beam is blanked and vertically and/or horizontally retraced. During these periods, the video signal comprises the blanking, retrace, color burst, and sync signals, as well as certain other signals for test, color alignment, closed caption, cueing, and so forth. Accordingly, there are periods of time in the transmission of each frame which are not used for picture presentation.

FIG. 4C illustrates a reformatted frame in accordance with the invention. As illustrated, the new format comprises a lesser number of longer lines when compared to the standard format in FIG. 4A. In the preferred embodiment, the novel format includes 241 active lines of information (compared to 241.5 active field lines in the standard active region of an NTSC field). Each line, however contains sufficient information to substantially reconstruct both paired video lines. Accordingly, one reformatted line contains sufficient information to substantially reconstruct two NTSC lines of information. Additionally, the total time required to transmit the reformatted frame (i.e., the line-pair sum and line pair difference signals for a frame of picture) is essentially the same as the total time for transmitting a single NTSC field.

In comparing the durations of conventional NTSC line signals and the reformatted line signal, it is convenient to refer to clocks, or samples, of a defined time duration. By counting clocks, or samples, the subsequent description of a preferred multiplexing system is simplified. Using a sample frequency, or clock frequency, exactly equal to four times the color subcarrier frequency, the line-pair sum signal may be said to occupy 744 clocks, compared to 754 in the standard active region. In essence, the line-pair sum signal $(a+b)/2$ occupies slightly less than the same amount of horizontal scan time as the standard active region. The line-pair difference signal $(a-b)/2$ occupies most of the remaining portion of the new line.

Since there is insufficient time to send the entire line-pair difference signal $(a-b)/2$, it is compressed so that sufficient information is transmitted to enable reconstruction of the two television frames with minimal artifacts. Since time compression increases bandwidth, the line-pair difference signal is first low pass filtered to reduce its bandwidth to $\frac{1}{4}$ of its original value. The signal is then time compressed by a factor of 4, by using every 4th sample and transmitting those samples at the same rate as the rate of transmission of the sum signal. The time compression increases the bandwidth of the difference signal back to its original, and permissible, value.

FIG. 5 is a schematic illustration of a reformatted line signal produced in accordance with the invention. The reformatted line signal commences with a black-level reference pulse. The pulse is 8 clocks in duration. The pulse is followed by a guard interval of 4 clocks and a line-pair difference signal of the appropriate line pair. The line-pair difference signal occupies 186 clocks and is followed by a 4 clock guard interval. A shortened color burst of 20 clocks follows, together with another 4 clock guard interval. The line-pair sum signal, occupying 744 clocks, together with a final 4 clock guard interval completes the reformatted line. There are accordingly 974 clocks per reformatted line, and 241 reformatted active lines provide a compressed frame of one video program.

The standard NTSC format provides for 477,750 clocks per frame at exactly four times the color subcarrier frequency. Accordingly, the multiplexing system herein must transmit two frames of information (i.e., one from each program) within 477,750 clock pulses, or samples. Since each reformatted line requires 974 samples, 490.5 lines can be accommodated.

As indicated above, the system produces only 482 reformatted lines to transmit a frame of each video program. Accordingly, 8.5 reformatted lines are still available for frame sync information, VIR and closed caption, etc.

The multiplexer accepts two frame-syncronized standard NTSC video signals, converts them into digital form by means of A/D converters having a sampling rate of four times the color subcarrier (i.e. approx. 14.3 MHz), packs the two pictures and reconverts the multiplexed signal to analog form for transmission.

THE ENCODER

Figure 6A:
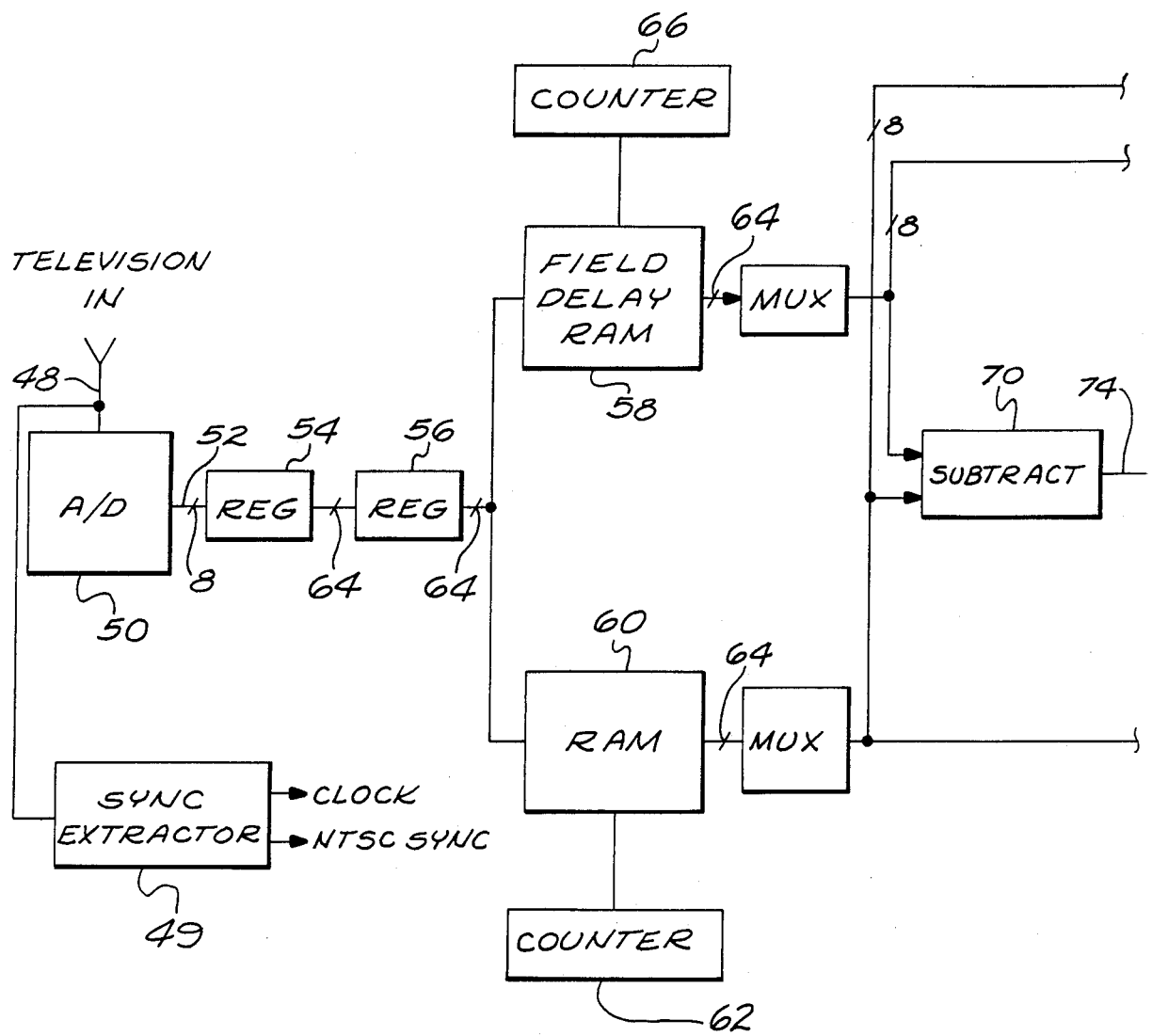
FIG. 6 is a block diagram schematic illustration of a multiplexer encoder constructed in accordance with the invention.
Figure 6B:
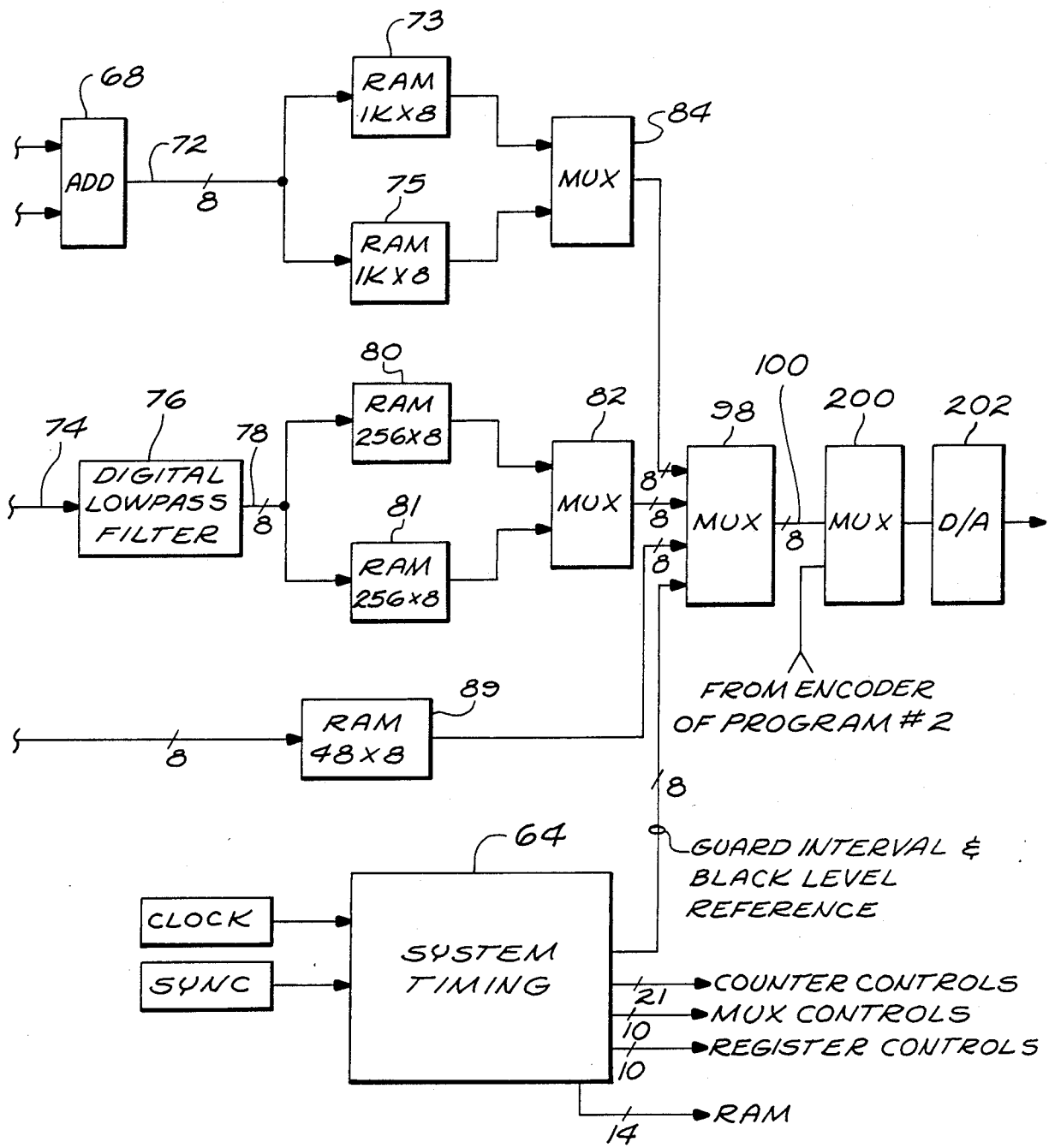

FIGS. 6A and 6B are functional block diagrams illustrating one channel of a two-channel encoder constructed in accordance with the invention. The encoder receives an NTSC analog television signal 48 and produces a series of reformatted line-pair signals at its output terminal 100. Each inputted pair of interlaced fields comprising an NTSC frame are reformatted at the output of the encoder as a compressed frame of 241 line-pair line signals.

The incoming analog television signal 48 is a standard NTSC signal comprising a plurality of sequential line signals. The line signals, in turn, comprise a horizontal sync pulse, color burst and video information, as well as a vertical blanking interval which occurs almost every 1/60 second. Each of the foregoing components is separated from the adjacent components by a guard interval. The order and duration of the NTSC signal components are defined exactly and well known.

The incoming television signal 48 is applied to a sync extraction means 49 which is responsive to the NTSC horizontal sync and color burst to produce sync signals and a clock signal of exactly four times the color subcarrier frequency. As will be appreciated, the clock signal is used by the encoder to digitize the incoming television signal and to access various components of the encoder in a precisely controlled manner.

The NTSC television signal 48 is digitized by an 8 bit analog/digital converter means 50, which samples the incoming signal at exactly 4 times the color subcarrier frequency. Each byte (i.e. 8 bit output) of signal 52 from the converter 50 is applied to the input of a first shift register 54. The number of bits passed between each pair of functional blocks is, by convention, shown on the line connecting the blocks. The first shift register stacks eight bytes at a time and passes them in parallel as a 64 bit word to a second shift register 56. Accordingly, the second shift register 56 is clocked at $\frac{1}{8}$ the speed of the first register 54.

From the second register 56, the 8-byte groups are clocked into random access memory (RAM) 58 or RAM 60. As the first NTSC field is presented to the encoder, its digitized values are clocked into RAM 58 and held in addresses determined by counter means 66. Counter means 66 is responsive to system timing means 64 to place the digitized values in preselected addresses. At the completion of the first field, RAM 58 has retained the sampled values of the color burst and video information associated with each line in the first field. The sync signals are ignored by disabling the RAM during the appropriate portion of the NTSC signal.

After the first field has been received, the NTSC line signals associated with the second field of the frame are received by the encoder. The digitized values of the color burst and video information from the second field are written into addresses in RAM 60, as determined by counter 62.

After several lines of the second field are written, the encoder begins to produce the line-pair sum and difference signals for the frame. Accordingly, RAM 58 is accessed to read the sampled signal values for points along each line in the first field and RAM 60 is accessed at the same time to read the value of corresponding points in the paired line from the second field of the frame. The RAMs 58 and 60 are correctly accessed in accordance with system logic, and the values from each line pair are clocked to adding means 68 and subtracting means 70 to respectively produce the line-pair sum and line-pair difference signals.

The first data read out of the RAM 60 is a shorter version of the color burst information which will have the correct phase relationship to the sum signal when separated by the four clock guard interval. The burst information is stored in RAM 89. Since sampling is performed at four times the color subcarrier frequency, the phase of the burst can later be determined from the samples. A sufficient number of samples is stored to permit the decoder to phase-lock to the transmitted samples. Twenty samples, representing 5 cycles of color burst are satisfactory.

To minimize storage requirements of RAM 60, two design strategies are employed. First, although each NTSC input line signal 48 is 910 clocks long, and is accordingly sampled 910 times, a predetermined number of samples are ignored by RAM 60, thereby eliminating the approximate 20 lines of vertical blanking interval.

Secondly, data is read from RAM 60 before all data for the second field has been written. The reformatted line which will ultimately be produced by the encoder is 974 clocks in length. Because the data written into RAM 60 over 910 clocks is clocked out of RAM 60 during 974 clocks, it is seen that reformatted lines are clocked out of RAM 60 more slowly than the rate at which NTSC lines were clocked in. The RAM 60 therefore slowly fills until the NTSC vertical sync interval, during which time it empties. Because RAM 60 is only required to store a few lines plus the information corresponding to the difference in the line lengths, less memory capacity is required than that of RAM 58.

As the second field comes in, its data is added and subtracted, on a sample-by-sample basis, with the data from the first field. The data from the paired lines of the first and second fields are accordingly presented to the adder 68, which produces respective 8 bit values forming the line-pair sum signal 72. The line-pair sum signal is stored in sum RAM 73.

The line-pair difference signal 74 from the subtracting means 70 is passed through digital low pass filter means 76 to remove frequency components above 1 MHz, thereby decreasing the bandwidth of the difference signal by a factor of approximately 4:1. Every fourth byte of the low pass filtered difference signal 78 is stored in difference RAM 80.

At the end of the 974 clocks, the line-pair sum signal is in RAM 73, the line-pair difference signal is in RAM 80, and the color burst data is in RAM 89. As the encoder produces the line-pair line signals of the compressed frame from the data in RAMS 73 and 80, the sum and difference signals for the next line-pair line is stored in alternate sum RAM 75 and alternate difference RAM 81.

To form the reformatted line signal, illustrated in FIG. 5 and representative of the information in both of the paired lines, the line-pair sum and line-pair difference values respectively stored in RAMs 73 and 80 are joined with the black-level reference pulse and the shortened color burst. The black level reference is generated by the system timing means 64 and coupled to the output terminal 100 of the encoder by output MUX switch means 98 under control of system timing means 64, which also couples the subsequent four clock-pulse guard interval to the output terminal.

The line-pair difference signal is read from the appropriate addresses of RAM 80 and clocked out via MUX 82 for 186 clock pulses, followed by a second guard interval from the timing means. Output MUX 98 next couples color burst RAM 89 to the output terminal and the 20 clocks of burst information are clocked out, followed by another 4 clock guard interval from the timing means 64.

Output MUX 98 next couples line-pair sum RAM 73 to the output terminal 100. RAM 73 is coupled to output MUX 98 by intermediate MUX 84, which is operable to select RAM 73 or alternative sum RAM 75. Appropriate memory locations are addressed by counter means in accordance with system logic. The 744 sum signal values are clocked out, followed by the coupling of the guard interval generating means to the output terminal.

In the preferred system, all of the reformatted line signals pertaining to a compressed frame of one program are followed by all of the reformatted line signals pertaining to a compressed frame of the other program. The two programs are thereby transmitted by this alternating compressed frame method, with information for the two compressed frames (i.e., one of each program) being transmitted every 1/30 of a second. Accordingly, the output of the encoder is coupled to a digital-to-analog converter means 202 through an additional MUX 200, whose other input is coupled to the encoder associated with the second program. The additional MUX 200 switches the D/A converter 202 between encoders almost every 1/30 second.

In addition to the foregoing, system timing means 64 produces a program index signal which distinguishes one program from the other. Accordingly, the decoder can distinguish the compressed frames of one program from the compressed frames of the other.

THE DECODER

Figure 7A:
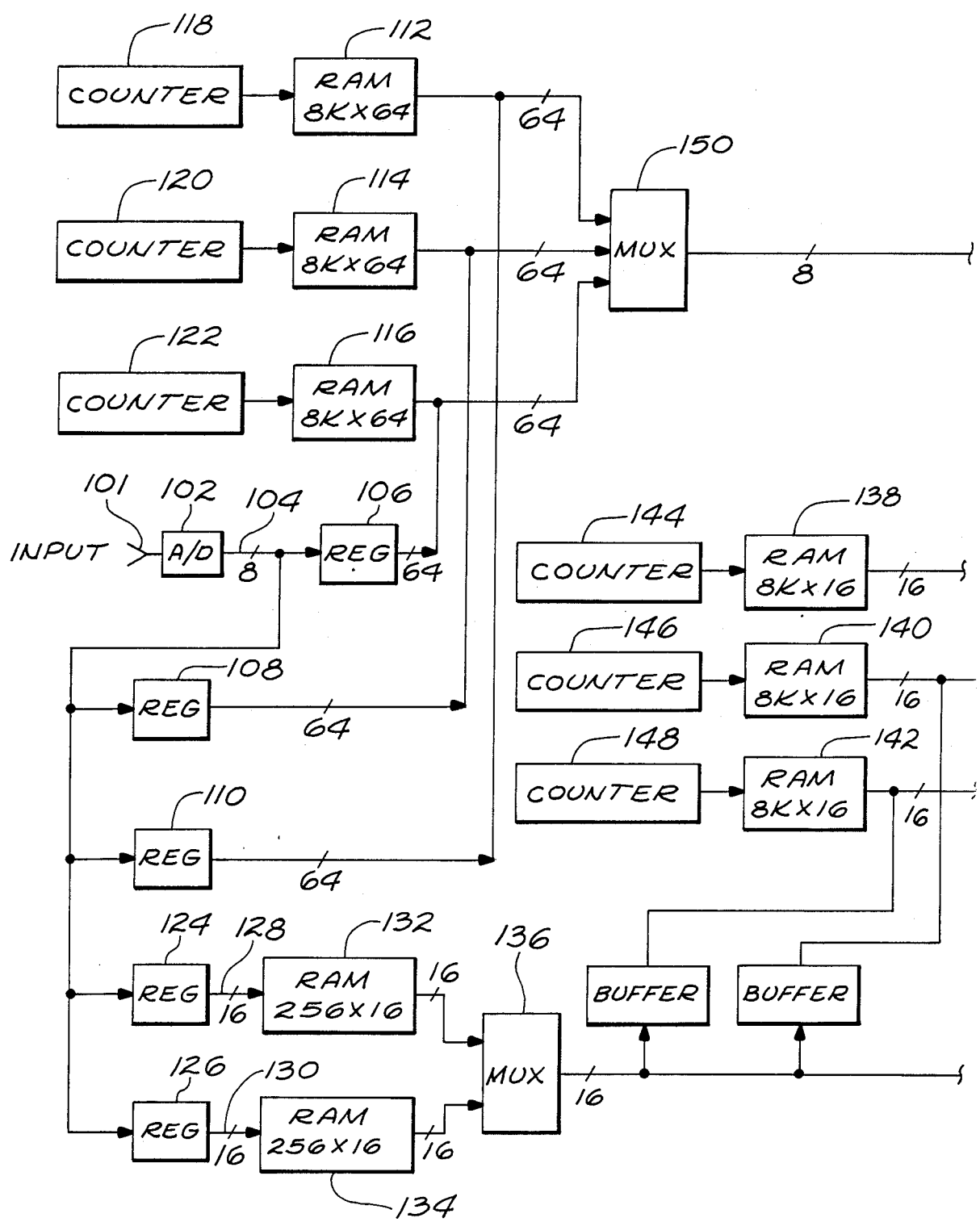
FIGS. 7A and 7B are block diagram schematic illustrations of a decoder constructed in accordance with the invention.
Figure 7B:
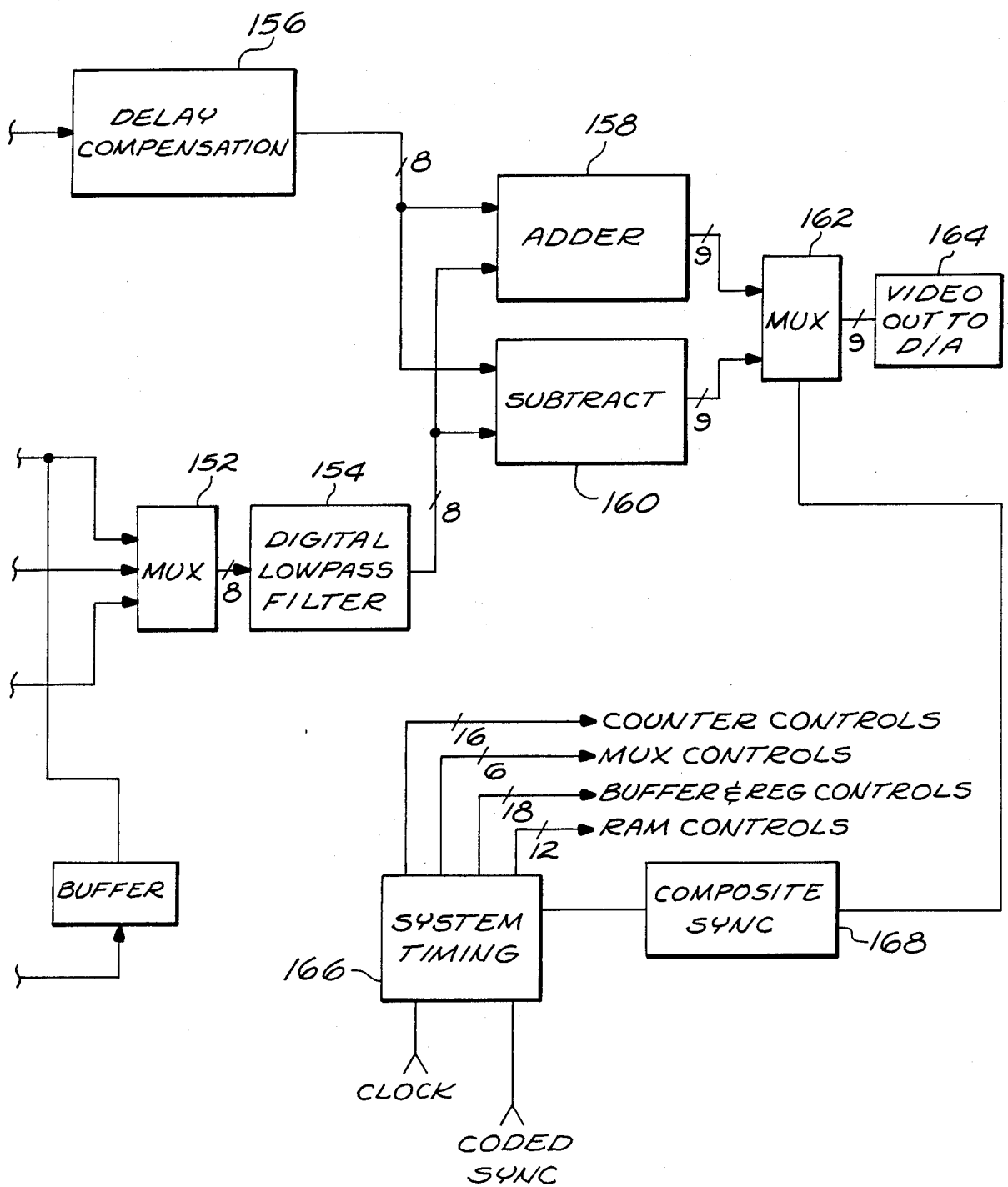

As shown in FIGS. 7A and 7B, the transmitted analog signal is received at input 101 of the decoder where it is coupled into A/D converter 102. The A/D converter samples the signal at a clock rate of exactly four times the color subcarrier frequency ($4 \times 3.58$ MHz), and produces a succession of 8 bit bytes 104 as the digitized signal value. Since all the components of the line-pair line signals are a known number of clocks from the program index signal (and are a known number of clocks in duration), the identity of the component can be determined by simply counting the number of clocks from the program index signal.

Following the black-level reference pulse (FIG. 5), are 186 samples of the line-pair difference signal from the first compressed frame of the first program. The 8 bit signal from the A/D converter 102 is accordingly applied to a selected one of two registers 124 or 126, which stack the bytes two deep and apply the resulting 16 bit signals 128 and 130, respectively, to RAMS 132 or 134 respectively. By stacking the bytes, the registers 124 and 126 permit data to be written into the memories 132 or 134 at a slower speed. The memories 132 and 134 are capable of storing $256 \times 16$ bits.

After the difference samples have been stored, the decoder can begin to time expand the data to the same time duration as the line-pair sum signal. Each byte of the compressed difference information in RAM memories 132 or 134 is accordingly applied four times through MUX switch 136 to RAM memories 138, 140, 142 and stored at addresses determined by counters 144, 146, 148 respectively.

Following the difference signal values, the color burst samples and line-pair sum signal appear at the decoder input and are sampled by the A/D converter 102. Five cycles of color burst have been transmitted, resulting in 20 samples of color burst emerging from the converter 102.

While the difference data is being clocked into RAMS 138, 140, 142, the digitized color burst and sum signal of the compressed frame are being stored in RAMS 112, 114, 116 at predetermined addresses determined by counters 118, 120, 122 respectively. The 8 bit output from the converter 102 is stacked eight deep by a selected one of registers 106, 108, 110 so that data can be written into the memories at a slower rate than the sampling rate.

RAMS 112, 114, 116 are 8k×64 and can accordingly store 8192×64 bits. Since each sample is represented by 8 bits, and, as illustrated in FIG. 5, 776 samples/line-pair line signal are to be stored, each of the memories can store information for 84 line-pair lines, for a total of 252 line-pair lines. As indicated earlier, there are only 241 line-pair lines of information per compressed frame.

Two hundred and forty one lines of data are stored as described above. As the 242nd through 482nd lines of data, containing information about a compressed frame of the second program, are directed into another decoding circuit, the color burst and sum data stored in memories 112, 114, 116 and the difference data in memories 138, 140, 142 are processed to substantially reconstruct the original odd and even NTSC fields from which the compressed frame was made.

As described earlier herein, each value in memory 112, 114, 116 represents the sum of two samples $A_m$, $B_n$, representing a pair of vertically adjacent picture elements in the original video frame. Similarly, each sample in memory 138, 140, 142 represents the difference between the samples $A_m$, $B_n$.

By adding the line-pair sum value to the line-pair difference value on a sample-by-sample basis along the two lines of the pair, the initial line signal values for one of the two paired lines is recovered:

$$(A + B)/2 + (A - B)/2 = A'$$

Similarly, subtracting the line-pair difference value from the line-pair sum value on a point-by-point basis recovers the line signal values for the other of the line pair:

$$(A + B)/2 - (A - B)/2 = B'$$

Accordingly, the sum and difference values of each line-pair are applied on a sample-by-sample basis to opposite inputs of adder and subtractor circuits 158 and 160 respectively. The difference values are applied to the adder and subtractor, via MUX switch 152, through a digital low pass filter 154, which smoothes the transition rate between held values and minimizes reconstruction error. The sum values are applied to the adder and subtractor via MUX 150 and delay circuit 156 to compensate for the delay of the low pass filter.

The adder and subtractor circuits 158 and 160 apply the values of the odd field sample A and even field sample B to output MUX switch 162 which selectively applies the A or B values to an output D/A converter 164. Accordingly, all the video lines are produced by the adder during one NTSC field, and by the subtractor during the other, interlaced, field.

The decoder reproduces the NTSC frame by selectively coupling composite sync generator 168 and the adder or the subtractor to an output D/A converter 164. The composite sync generator is coupled to the convertor in accordance with system timing means 166 to produce the blanking, sync, and other non-video NTSC signal components, whose waveforms and timing conform to NTSC standards. By correctly coupling the generator, adder, and subtractor to the converter 164, the decoder substantially reconstructs the original frame of NTSC video.

While the foregoing description has illustrated and described a preferred embodiment of an NTSC system, it will be apparent that numerous modifications and variations will occur to those skilled in the art having the benefit of these teachings. It is accordingly intended that the appended claims cover all such variations and modifications as fall within the true spirit and scope of the present invention.

We claim:

1. A method for encoding for transmission a television frame composed of odd and even fields having a plurality of video lines formed by respective video signals, comprising the steps of:
    (a) producing line-pair sum signals proportional to the sum of the composite video line signals for respective pairs of video lines, the respective lines pairs being formed from lines of the odd and even fields of a program frame to be transmitted;
    (b) producing time-compressed, bandlimited, line-pair difference signals proportional to the difference of the line signals for the respective line pairs and having no greater bandwidth than that of the line-pair sum signal;
    (c) forming line-pair line signals from the sum and difference signals; and
    (d) producing without prior separation of the chrominance components from the composite signals the line-pair line signals of the program frame during one or more time intervals whose total is substantially equal to the time allotted by the broadcast system for transmission of a program field, chrominance information in the line-pair line signals being within a selected one of the sum and difference signals forming the line-pair line signal.

2. For use with television programs having line signals for at least one program frame composed from odd and even fields, a method for transmitting two television programs via a single communications channel having a limited bandwidth comprising the steps of
    (a) encoding each program by
        (i) producing line-pair sum signals proportional to the sum of the composite line signals for respective line pairs, the line pairs being formed from the lines of the odd and even fields of the program frame to be transmitted;
        (ii) producing time-compressed, bandlimited, line-pair difference signals proportional to the difference of the line signals for respective line pairs and having no greater bandwidth than that of the line pair sum signal;
        (iii) forming line-pair line signals from the sum and difference signals without prior separation of the chrominance components of the composite line signals from the luminance components thereof;
    (b) transmitting the line-pair line signals of two program frames in the time allotted by the broadcast system for transmission of a single program frame; and
    (c) decoding the transmitted line-pair line signals to recover the chrominance and luminance components of the odd and even fields of the transmitted frames.

3. The method of claim 2 including in step (A (iii)) the step of forming line-pair line signals of longer duration than the broadcast system's standard.

4. The method of claim 2 including in step (A (iii)) the step of forming fewer line-pair line signals per program frame than the number of lines in an broadcast system's frame.

5. The method of claim 2 including the step of low pass filtering the line-pair difference signal prior to transmission.

6. The method of claim 5 including in step (A(iii)) the step of forming the line-pair line signals from the line-pair sum and line-pair difference signals of the same respective line pair.

7. The method of claim 5 including the step of replacing the blanking interval portion of the video line signals with a relatively shorter reference signal prior to transmission of the line-pair line signals formed therefrom.

8. The method of claim 5 includes the step of low pass filtering the line-pair difference signals prior to time compression to decrease its bandwidth by the approximate reciprocal of the compression-induced increase.

9. The method of claim 8 wherein the step of low pass filtering the line-pair difference signals utilizes a cut-off frequency of approximately 1 MHz.

10. The method of claim 2 wherein the respective line pairs are formed from vertically adjacent lines in the odd and even fields.

11. The method of claim 10 wherein the paired lines have the same color subcarrier phase.

12. A method for encoding two standard-bandwidth television program signals for transmission via a system having less than twice the standard bandwidth comprising the steps of:
(i) pairing each line of video information to be encoded in a first video field with a vertically adjacent line in a second video field having the same color subcarrier phase to define a plurality of line pairs;
(ii) summing the respective video line signals of the paired lines to form a sum signal for each line pair;
(iii) differencing the respective video line signals of the paired lines to form a difference signal for each line pair;
(iv) preserving the substantial bandwidth of the sum signals for transmission;
(v) low pass filtering the difference signals to reduce their respective bandwidth;
(vi) subsampling the low passed difference signal for time compression to substantially the same bandwidth as the sum signal; and
(vii) transmitting essentially non-compressed sum signals and compressed, low pass filtered difference signals at substantially the same bandwidth.

13. For use with television signals formed from a plurality of television line signals of a video frame, a multiplexing system for transmitting first and second independent television signals through a transmission system, the transmission system being band-limited to transmit less than both television signals and allotting a frame time interval within which a video frame can be transmitted comprising:
(A) encoding means operable on the first and second television signals, and including
(1) line-pair sum signal producing means for summing the signal representative of lines in the odd fields of a television frame with respective associated line signals in the even field the summed signals including both chrominance and luminance information;
(2) difference signal producing means for differencing the associated line signals;
(3) compression means for time compressing the difference signal without substantial increase in bandwidth over the bandwidth of the transmission system; and
(4) means for sequentially producing the line-pair sum signals and the compressed difference signals for the odd and even fields of the television frame during no more than one-half the frame time interval allotted by the transmission system;
(B) means for sequentially outputting the line-pair sum signals and compressed difference signals from two television frame so that the information from the two frames is produced in approximately the frame time 30 interval allotted by the transmission system, with the chrominance information being contained in the line-pair signals; and
(C) decoding means including
(1) means for summing the line-pair sum signal and difference signal of the associated field lines to substantially recover both the luminance and chrominance information for one of the two field lines; and
(2) means for differencing the line-pair sum signal and difference signals of the associated video field lines to recover both the luminance and chrominance information for the other of the two fields lines.

14. For use with television signals formed from a plurality of line signals representing a succession of video frames, an encoder for use in a multiplexing system of the type wherein a pair of independent television signals are transmitted through a transmission system having a bandwidth less than twice that of a single television signal and comprising:
means for pairing lines of video information in one field of a video frame with respective associate lines of video information in the other field to define a plurality of paired lines;
means for summing the line signals of respective pairs of frame lines to produce a plurality of line-pair sum signals;
means for differencing the signals in each line pair to produce a plurality of line-pair difference signals;
means for compressing the line-pair difference signals without substantially increasing their bandwidth;
means for producing a plurality of reformatted line signals, each signal including the sum and compressed difference signal of a respective line pair, each reformatted line signal being longer in duration than the line signal from which it was formed, the number of reformatted line signals per frame being less than the number of video lines in the television frame.

15. A method for encoding composite line signals of a television frame for transmission comprising the steps of:
pairing lines of the odd and even field of the frame to be transmitted having the same color subcarrier phase;
producing a pair of mathematically linearly independently, linear combination signals from the composite line signals of each line-pair;
time-compressing one signal of each pair of combination signals without increasing its bandwidth substantially beyond the bandwidth of the other combination signal; and
transmitting the compressed ones of the combination signals with the essentially uncompressed other combination signals.

16. A decoder for decoding an encoded television frame having odd and even field lines prior to encoding, the decoder comprising:
    (a) means for receiving an input signal containing an encoded television frame, the input signal including a plurality of sum signal portions and a plurality of difference signal portions,
    each sum signal portion being indicative of the sum of composite line signals of a pair of lines in the unencoded television frame,
    each difference signal portion being indicative of the time-compressed difference between the line signals of the line pair;
    (b) means for time-expanding the difference signal portions to the same time interval as the sum signal portions;
    (c) an adder for adding the sum signal portion and time-expanded difference signal portion for each line pair to substantially recover both the chrominance and luminance information of one of the paired line signals; and
    (d) a substractor for differencing the sum signal portion and time-expanded difference signal portions to substantially recover both the chrominance and luminance information of the other of the paired line signals.

17. A decoder for decoding an encoded television frame having odd and even field lines prior to encoding, the decoder comprising:
    (a) means for receiving an input signal containing an encoded television frame, the input signal including a plurality of first signal portions and a plurality of second signal portions,
    the first and second signal portions being mathematically linearly independent linear combinations of line signals of respective pairs of lines in the unencoded television frame, one of the first and second portions including both luminance and chrominance information,
    the other of the first and second signal portions being time-compressed without an increase in its bandwidth beyond substantially that of the other signal portion;
    (b) means for time-expanding said other signal portion to the same time interval as said one signal portion; and
    (c) means for combining said one signal portion of each line pair with said other time-expanded signal portion of the line pair to substantially recover the chrominance and luminance information of each line in the pair without modulation of a subcarrier with the chrominance information.

18. The decoder of claim 16 wherein where the time-expanding means time-expands the difference signal portions to the same time intervals as the respective sum signal portions in the received signal.

19. For use with television programs having line signals for at least one program frame composed from odd and even fields, a method for transmitting two television programs via a single communications channel having a limited bandwidth comprising the steps of
    (a) encoding each program by
        (i) producing line-pair sum signals proportional to the sum of the composite line signals for respective line pairs, the line pairs being formed from the lines of the odd and even fields of the program frame to be transmitted, the color burst portions of the line signals being shortened prior to production of the line-pair sum signals therefrom;
        (ii) producing time-compressed, low pass filtered, bandlimited, line-pair difference signals proportional to the difference of the line signals for respective line pairs and having no greater bandwidth than that of the line-pair sum signal;
        (iii) forming line-pair line signals from the line-pair sum and line-pair difference signals of the same respective line pair;
    (b) transmitting the line-pair line signals of two program frames in the time allotted by the broadcast system for transmission of a single program frame; and
    (c) decoding the transmitted signal to recover the odd and even field information of the transmitted frames.

20. A method for encoding for transmission a television frame composed of odd and even fields having a plurality of video lines formed by respective video signals, comprising the steps of:
    (a) producing line-pair sum signals proportional to the sum of the composite video line signals for respective pairs of video lines, the respective line pairs being formed from lines of the odd and even fields of a program frame to be transmitted;
    (b) producing time-compressed, bandlimited, line-pair difference signals proportional to the difference of the line signals for the respective line pairs and having substantially the same bandwidth as the line-pair sum signals;
    (c) forming line-pair line signals from the sum and difference signals; and
    (d) producing without prior separation of the chrominance components from the composite signals the line-pair line signals of the program frame during one or more time intervals whose total is substantially equal to the time allotted by the broad cast system for transmission of a program field, chrominance information in the line-pair line signal being within a selected one of the sum and difference signals forming the line-pair line signal.

21. For use with television programs having line signals for at least one program frame composed from odd and even fields, a method for transmitting two television programs via a single communications channel having a limited bandwidth comprising the steps of
    (a) encoding each program by
        (i) producing line-pair sum signals proportional to the sum of the composite line signals for respective line pairs, the line pairs being formed from the lines of the odd and even fields of the program frame to be transmitted;
        (ii) producing time-compressed, bandlimited, line-pair difference signals proportional to the difference of the line signals for respective line pairs and having substantially the same bandwidth as that of the line-pair sum signal;
        (iii) forming line-pair line signals from the sum and difference signals without prior separation of the chrominance components of the composite line signals from the luminance components thereof;
    (b) transmitting the line-pair line signals of two program frames in the time allotted by the broadcast system for transmission of a single program frame; and (c) decoding the transmitted signal to recover the odd and even field information of the transmitted frames.

22. For use with television signals formed from a plurality of television line signals of a video frame, a multiplexing system for transmitting first and second independent television signals through a transmission system, the transmission system being band-limited to transmit less than both television signals and allotting a frame time interval within which a video frame can be transmitted comprising:
- (A) encoding means operable on the first and second television signals, and including
  - (1) line-pair sum signal producing means for summing the signal representative of lines in the odd fields of a television frame with respective associated line signals in the even field, the summed signals including both chrominance and luminance information;
  - (2) differential signal producing means for differencing the associated line signals;
  - (3) compression means for time compressing the differential signal without substantial increase in bandwidth over the bandwidth of the transmission system; and
  - (4) means for sequentially producing the line-pair sum signals and the compressed differential signals for the odd and even fields of the television frame during approximately the frame time interval allotted by the transmission system;
- (B) means for sequentially outputting the line-pair sum signals and compressed differential signals from two television frames so that the information from the two frames is produced in approximately the frame time interval allotted by the transmission system, with the chrominance information being contained in the line-pair signals; and
- (C) decoding means including
  - (1) means for summing the line-pair sum signal and differential signal of the associated field lines to substantially recover the luminance and chrominance information for one of the two field lines; and
  - (2) means for differencing the line-pair differential signals of the associated video field lines to recover the luminance and chrominance information for the other of the two field lines.

23. For use with television programs having line signals for at least one program frame composed from odd and even fields, a method for transmitting two television programs via a single communications channel having a 5 limited bandwidth comprising the steps of
- (a) encoding each program by
  - (i) producing line-pair sum signals proportional to the sum of the composite line signals for respective line pairs, the line pairs being formed from the lines of the odd and even fields of the program frame to be transmitted, the color burst portions of the line signals being shortened prior to production of the line-pair sum signals therefrom;
  - (ii) producing time-compressed, low pass filtered, bandlimited, line-pair difference signals proportional to the difference of the line signals for respective line pairs and having approximately the same bandwidth as the line-pair sum signal;
  - (iii) forming line-pair line signals from the line-pair sum and line-pair difference signals of the same respective line pair;
- (b) transmitting the line-pair line signals of two program frames in the time allotted by the broadcast system for transmission of a single program frame; and
- (c) decoding the transmitted signal to recover the odd and even field information of the transmitted frames.

* * * * *